US006609733B2

(12) United States Patent
Gilmore

(10) Patent No.: US 6,609,733 B2
(45) Date of Patent: Aug. 26, 2003

(54) DIFFERENTIAL PRESSURE FITTING

(75) Inventor: Dan Gilmore, Roseville, CA (US)

(73) Assignee: E-Z Flo Injection Systems, Inc., Wexford, PA (US)

( * ) Notice: Subject to any disclaimer, the term of this patent is extended or adjusted under 35 U.S.C. 154(b) by 67 days.

(21) Appl. No.: 09/774,162

(22) Filed: Jan. 29, 2001

(65) Prior Publication Data

US 2002/0145282 A1 Oct. 10, 2002

(51) Int. Cl.[7] .......................... F16L 33/00; F16L 47/00; F16L 49/00

(52) U.S. Cl. .................... 285/239; 385/192; 385/143.1; 138/40

(58) Field of Search ................................ 285/192, 219, 285/220, 143.1, 193, 239, 196, 921; 138/40, 37

(56) References Cited

U.S. PATENT DOCUMENTS 1,627,896 A * 5/1927 Hanson .................... 200/81 R
1,710,535 A * 4/1929 Fowler ....................... 204/241
3,052,525 A 9/1962 Vogelmann
3,581,565 A * 6/1971 Dieterich ................. 73/861.66
4,114,195 A 9/1978 Dirksing
4,154,100 A * 5/1979 Harbaugh et al. ....... 73/861.66
4,339,332 A 7/1982 Jasperson
4,498,347 A * 2/1985 Grantham et al. ....... 73/861.66
4,597,597 A * 7/1986 Bloor et al. ................ 285/196
4,624,487 A 11/1986 Thalmann
4,846,214 A 7/1989 Strong
4,917,152 A 4/1990 Decker
5,010,912 A 4/1991 Riding
5,251,938 A * 10/1993 Erickson .................. 285/121.6
5,625,156 A * 4/1997 Serrels et al. ............ 73/863.51
5,763,794 A * 6/1998 Marrelli ...................... 324/640
5,913,249 A * 6/1999 Weckstrom .............. 73/861.52
5,969,266 A * 10/1999 Mahoney et al. ........ 73/861.65

* cited by examiner

*Primary Examiner*—Lynne H. Browne
*Assistant Examiner*—Aaron Dunwoody
(74) *Attorney, Agent, or Firm*—Mark R. Galis; Gary R. Jarosik

(57) ABSTRACT

A pipe connection fitting having at one end a tapered edge (1) which communicates at its base with tightening nut (2) which communicates with male pipe threads (3) which communicates with extension member (4) having an angle cut (6) with a flow port (5) through the center of the fitting. Positive differential pressure is created by installing a differential pressure fitting facing into the fluid stream of a flow line. Negative differential pressure is created by installing a differential pressure fitting facing away from the fluid stream of a flow line. Tubing connects the fittings to a pressure tank containing the fluid to be injected in the flow line. Fluid flow past the fittings in the flow line motivates flow from the flow line to the pressure tank and from the pressure tank back to the flow line. The fitting being made of rigid plastic or metal.

28 Claims, 4 Drawing Sheets

DIFFERENTIAL PRESSURE FITTING

CROSS-REFERENCE TO RELATED APPLICATIONS

Not applicable.

BACKGROUND

1. Field of Invention

This invention relates to pipe fitting connections, specifically as it relates to fluid injection equipment connections.

2. Description of Prior Art

It has been common practice to connect injection equipment to a flow line by installing a tee or saddle in the flow line with piping attached to the injection device. If the injection device is mechanically powered, it would generate enough pressure to overcome the pressure in the flow line and inject the fluid into the flow line.

If the injection device were not mechanical, it would commonly rely on the fluid from the flow line to create injection into the flow line. This would be done by either creating a venturi in the flow line or by diverting fluid in and out of the injection device. A venturi creates enough suction to pull fluid from a vessel into the flow line. When fluid is diverted in and out of the injection device, the injection device is pressurized to the same pressure as the flow line. To accomplish injection back into the flow line, a pressure differential is accomplished by creating a flow restriction between the outlet connection in the flow line and the inlet connection in the flow line. This is commonly done by installing a valve between the two connections or by inserting a type of deflection member or some other type of flow restriction in the flow line.

Several types of pressure differential connections have been designed to accomplish flow out of a flow line, into an injection device and back into the flow line. The U.S. Pat. No. 4,846,214, Fluid Additive Injector by Thomas F. Strong integrates the outlet and inlet injection connections into the injector unit. The unit is then suspended from the flow line. The disadvantages to this type of connection is that the weight of the tank puts stress on the flow line which limits the size of the unit that can be installed and may require flow line piping be changed to accommodate the unit. This increases the time it takes to install the unit as well as the cost of installation. It also requires a unit that matches the pipe size and type in which it is being installed. This increases manufacturing costs and complicates installation. The installer needs to know the size and type of pipe in which the unit is to be installed prior to making the installation. The installer has to insure the flow line piping will support the weight of the injector unit. The injector tank has to be at the flow line connection point, which can make it difficult to conceal or secure.

The U.S. Pat. No. 4,624,487, Molded Tapping Fitting For Connecting A Branch Line To A Pipeline by Alfred Thalmann is designed to aid in tapping a branch line connection into a flow line. It does not have a protrusion into the flow line so it would not provide a consistent flow through the branch line at all levels of flow and pressure.

The U.S. Pat. No. 4,114,195, Fluid Injector by Robert S. Dirksing; Estel R. Todd is designed to mix two or more fluids. It does not create flow from a flow line to a tank and back into the flow line.

The U.S. Pat. No. 4,917,152, Fluid Injector by William T. Decker creates suction in the flow line to draw fluid into the flow line from a vessel. This design does not draw fluid from the flow line to pressurize a tank and then return fluid from the tank to the flow line. Since the tank is not pressurized to the same level as the flow line, a higher suction is required to accomplish injection. This requires higher flow rates and higher pressure in the flow line before injection will begin. It will not inject in low pressure and low flow applications, limiting the applications in which it can be used.

The U.S. Pat. No. 4,339,332, Pressurized Chemical Dispenser by Harold C. Jasperson relies on a differential pressure created between the outlet and inlet connection in the flow line by a filter that is installed between the two connections. The connections to the flow line do not create a consistent flow out of the flow line, into the vessel and back into the flow line without the presence of the filter between the connections. This limits the applications the connection can be used in and complicates the installation process.

The U.S. Pat. No. 5,010,912, Water Treating Device, or Similar Article by Richard D. Riding utilizes a member extending into the supply line with an angled cut facing into the flow for outlet flow to the vessel and away from the flow for inlet from the vessel. The members are an integral part of the unit. The unit is then suspended from the flow line. The disadvantages to this type of connection is that the weight of the tank puts stress on the flow line which limits the size of the unit that can be installed and may require the flow line piping be changed to accommodate the unit. This increases the time it takes to install the unit as well as the cost of installation. It also requires a unit that matches the pipe size in which it is being installed. This increases manufacturing costs and complicates installation. The installer needs to know the size and type of pipe in which the unit is to be installed prior to making the installation. The installer also needs to insure the flow line piping can support the weight of the injector tank. The tank must be at the connection point making it hard to conceal and secure.

The U.S. Pat. No. 3,052,525, Apparatus For Introducing Controlled Quantities of Liquids And Solutes Into A Fluid Medium by E. Vogelmann ET AL relies on a baffle plate between the outlet and inlet connection to create flow from the flow line to the vessel and from the vessel back into the flow line. This reduces flow line volume and pressure which is not desired in most applications.

OBJECTS AND ADVANTAGES

Accordingly, several objects and advantages of my invention are:

(a) Installs in steel, copper, plastic or virtually any type of piping system eliminating the need to know the type of pipe prior to installation.

(b) Extension member length can be adjusted so it can be installed in any size pipe without knowing the pipe size prior to installation.

(c) Taps directly into the flow line eliminating cutting and subsequent repair of a cut flow line or into any style or type of pipe fitting or connection.

(d) Provides broad flow rate adjustment by changing the penetration depth of the extension member.

(e) Eliminates the need for flow restriction between the inlet and outlet connections, to create flow to and from the injector tank that eliminates pressure and flow volume loss.

(f) Creates a small differential pressure in the flow line that creates a very accurate injection rate at all flow levels because the flow to the injector adjusts automatically with the flow and pressure changes in the flow line.

(g) Allows the injection tank to be placed away from the connection point. This eliminates the stress of a heavy injector tank mounted on the flow line, which provides the ability to attach any size tank to the flow line. It also provides the ability to place the tank in a secured area away from the installation connection point.

(h) Creates a small differential pressure in the flow line and equalizes pressure between the vessel and the flow line. This enables injection to occur with a minimum amount of flow and pressure making it adaptable to virtually all installation applications.

(i) Directional indicator enables the fitting to be installed with angle cut pointing in the correct direction.

(j) Installs without changing the flow line piping to accommodate the unit.

(k) Installs easily in a very confined or hard to get to area.

Further objects and advantages are that the fitting is more economical to produce in that one fitting can be used in many sizes and types of pipe, eliminating the need to manufacture the fitting out of multiple materials and in multiple sizes. It can be molded in plastic that is more economical than casting or cutting from metal. Still further objects and advantages will become apparent from a consideration of the ensuing description and drawings.

SUMMARY

In accordance with the present invention a differential pressure fitting comprises a connection means for connection to the tank, an attachment means for attachment to the flow line, extension member to penetrate flow line, an alignment indicator and a flow port to allow fluid flow through the fitting.

DRAWING FIGURES

Reference Numerals In Drawings

| | |
|---|---|
| 1 barbed tubing connection | 2 tightening nut |
| 3 male pipe threads | 4 extension member |
| 5 flow port | 6 angle cut |
| 7 adjustment nut | 8 alignment indicator |
| 9 outlet fitting | 10 inlet fitting |
| 11 flow line | 12 flow direction |
| 13 tightening nut | 14 adjustment nut |
| 15 sprinkler supply line | 16 sprinkler zone valve |
| 17 vacuum breaker | 18 sprinkler flow line |
| 19 outlet tube to tank | 20 inlet tube from tank |
| 21 tank | 22 outlet tube connection to tank |
| 23 inlet tube connection to tank | 24 flow direction |
| 25 flow direction | 26 hose connection |
| 27 hose | 28 hose bib |
| 29 flow restrictor | |

DESCRIPTION

Figure 1:
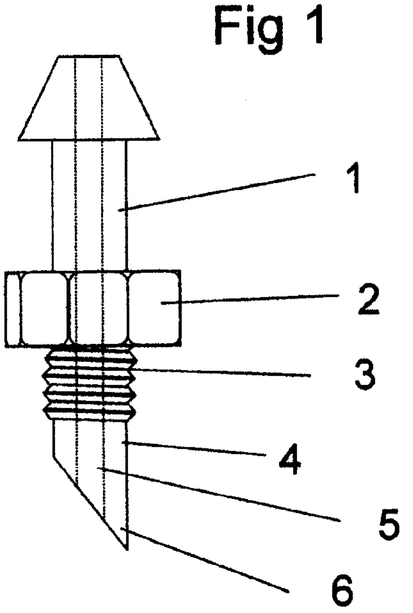
FIG. 1 shows a side view of the differential pressure fitting.
Figure 2:
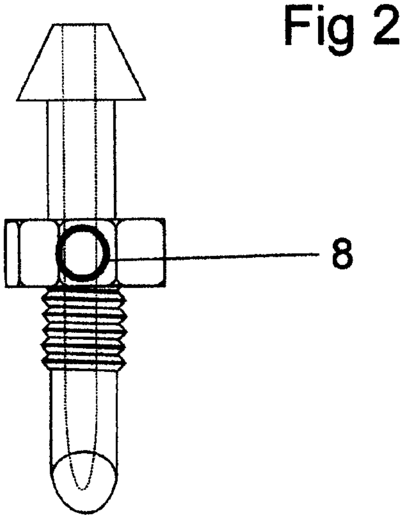
FIG. 2 shows a front view of the differential pressure fitting with the directional indicator.

FIGS. 1 and 2—Preferred Embodiment

A preferred embodiment of the differential pressure fitting is shown in FIG. 1 (side view) and FIG. 2 (front view). The fitting is molded from rigid nylon to prevent breaking when stressed. Nylon is readily available from a number of manufacturers. It can be made from any type of plastic or metal. A rigid and durable material is preferred. The barbed tubing connection 1 has a tapered lead in edge to accommodate sliding flexible tubing over it. The tightening nut 2 is at the base of the barbed tubing connection 1. It is octagonal in shape to accommodate a standard wrench. Male pipe threads 3 begin immediately after the tightening nut 2 and go down the extension member 4. The male pipe threads 3 extend far enough down the extension member 4 to accommodate the connection they will be connected to. Extension member 4 goes from the end of the male pipe threads 3 to the end of the fitting. It has an angled cut 6 on the end opposite the barbed tubing connection 1. The length of the extension member 4 combined with the length of male pipe threads 3, should be long enough to allow the extension member 4 to reach the center point of the interior of the flow line when it is installed. Flow port 5 passes through the center of the fitting from the end of the barbed tubing connection 1 to the end of the extension member 4, providing a flow path through the fitting. The alignment indicator FIGS. 2–8 is molded into the tightening nut 2 so that it is directly in line with the shortest point of extension member 4 angle cut 6.

Figure 3:
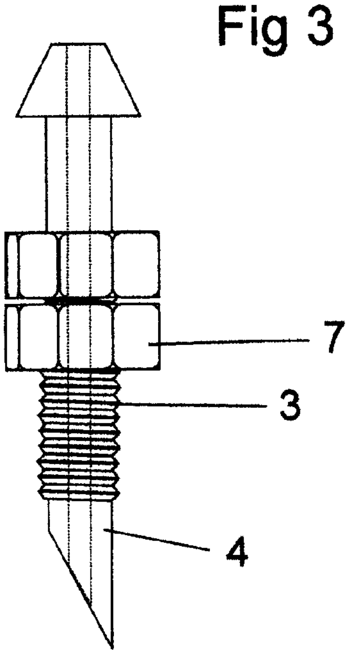
FIG. 3 shows the differential pressure fitting with adjustable depth feature.
Figure 4:
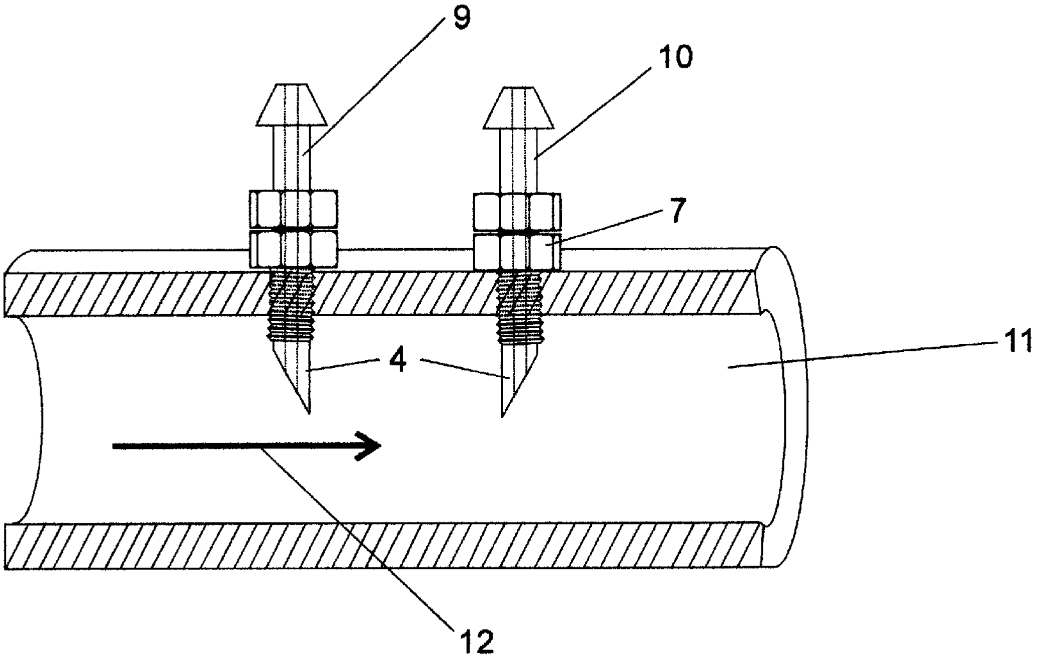
FIG. 4 shows the inlet and outlet differential pressure fittings with adjustable depth feature installed in a flow line.
Figure 5:
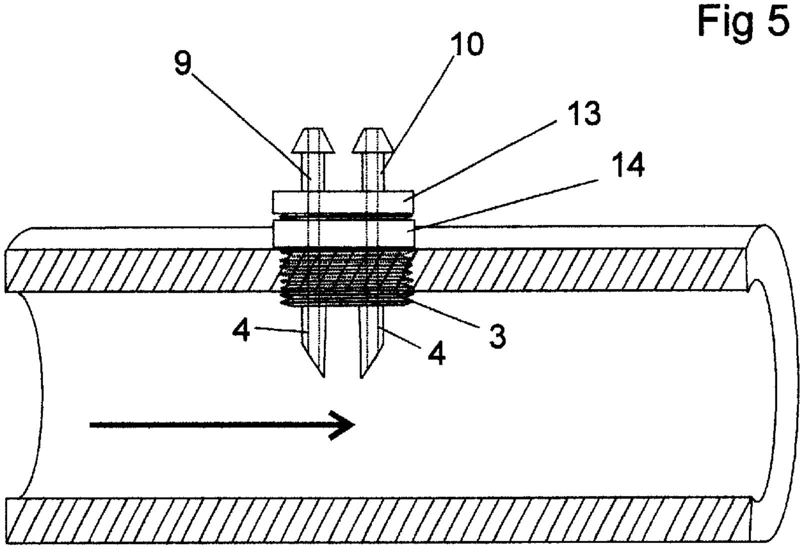
FIG. 5 shows the inlet and outlet differential pressure fittings combined in one fitting with the adjustable depth feature, installed in a flow line.

FIGS. 3–5—Additional Embodiments

Additional embodiments are shown in FIGS. 3 and 5. FIG. 3 shows the addition of adjustment nut 7, the lengthening of male pipe threads 3 and the lengthening of extension member 4. FIG. 5 shows the combining of outlet fitting 9 and inlet fitting 10 into one fitting which includes adjustment nut 14.

Operations—FIGS. 4, 5, 6, 7

The method of using the differential pressure fitting is to install it in a flow line or hose with the outlet fitting 9 installed so the directional indicator faces into the fluid flow and inlet fitting 10 faces away from the fluid flow.

It is installed by drilling and tapping the flow line 11 or hose connection 26 with a pipe tap that corresponds to the male pipe threads 3 of the fitting. Once the flow line 11 is tapped, the differential pressure fitting is screwed into the tapped hole until the tightening nut 2 is tight against the outside wall of the flow line 11. With the adjustable fittings in FIGS. 3 and 4, the adjustment nut 7 and 14 are screwed onto the fitting so that when they are installed in the flow line 11, they will allow extension member 4 to reach the center point of the flow line.

Figure 6:
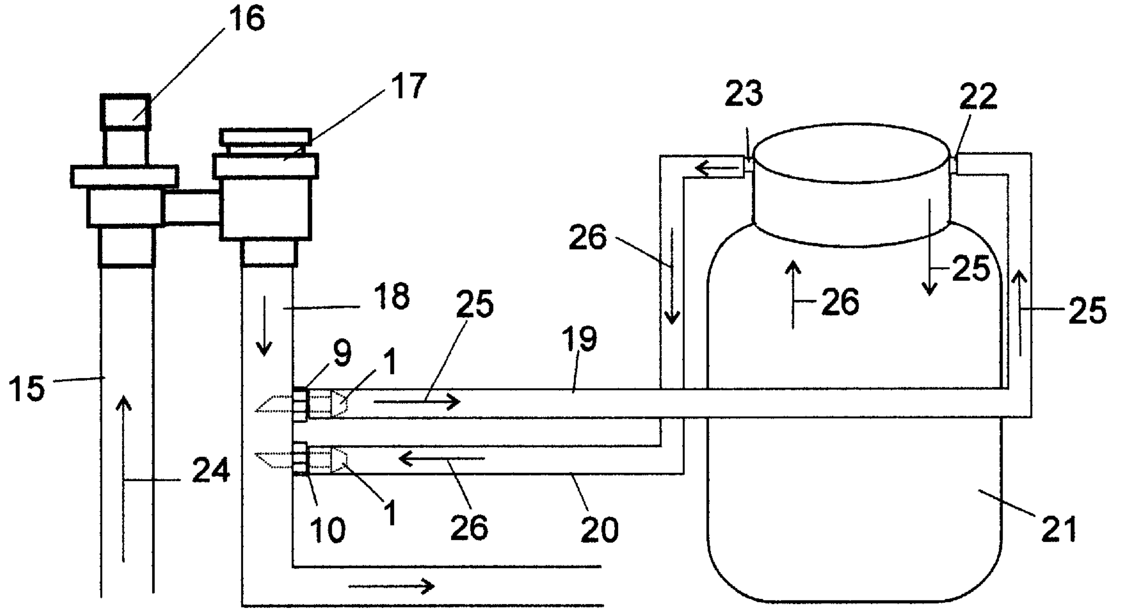
FIG. 6 shows the inlet and outlet differential pressure fittings installed in a flow line and attached to the tank.
Figure 7:
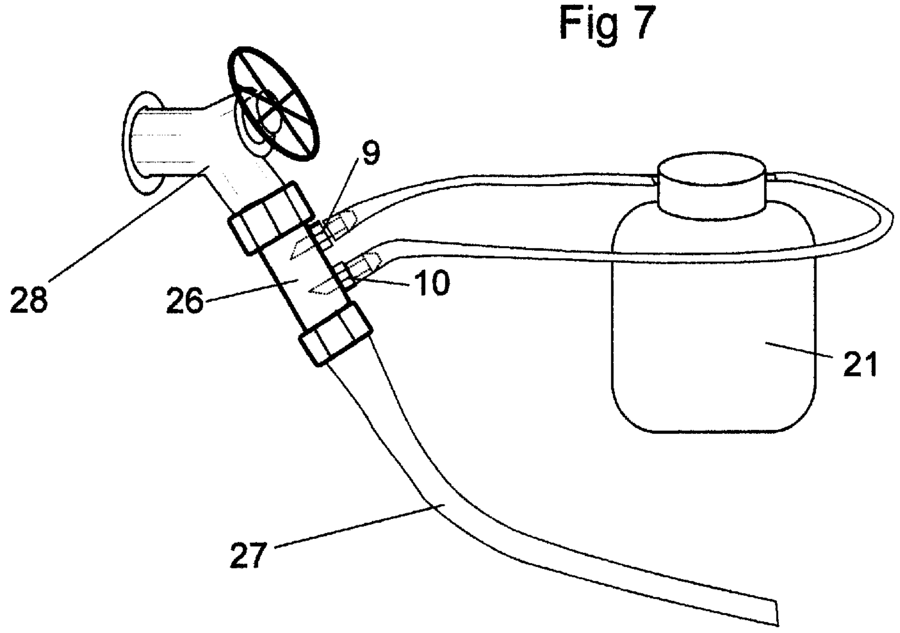
FIG. 7 shows the inlet and outlet differential pressure fittings installed in a hose connection fitting and attached to the tank.
Figure 8:
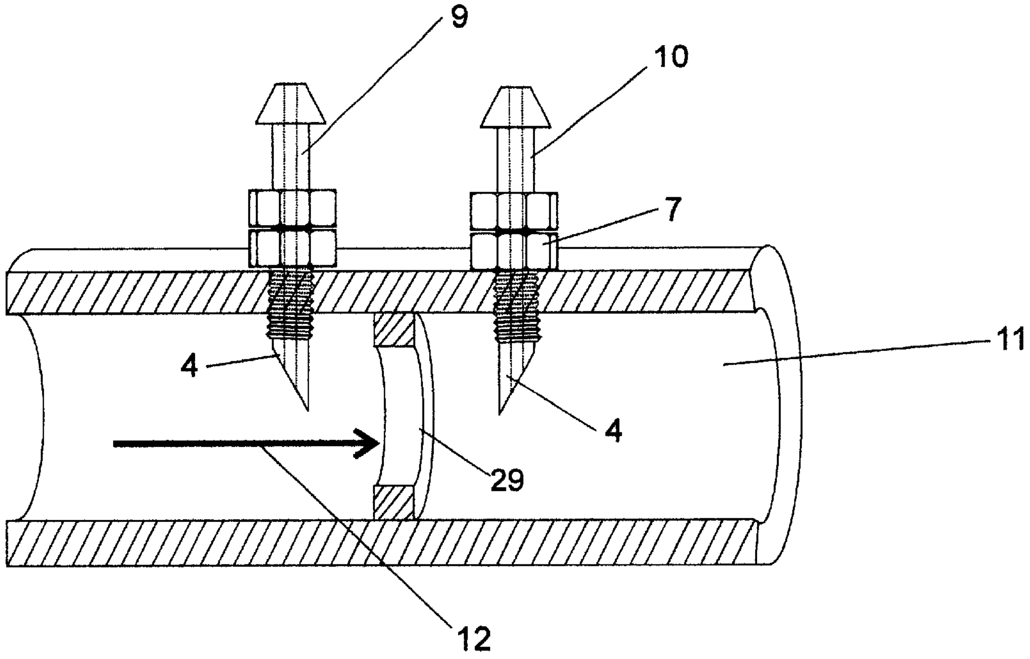
FIG. 8 shows the inlet and outlet differential pressure fittings installed in a flow line with a flow restriction between the inlet and outlet fittings.
Figure 9:
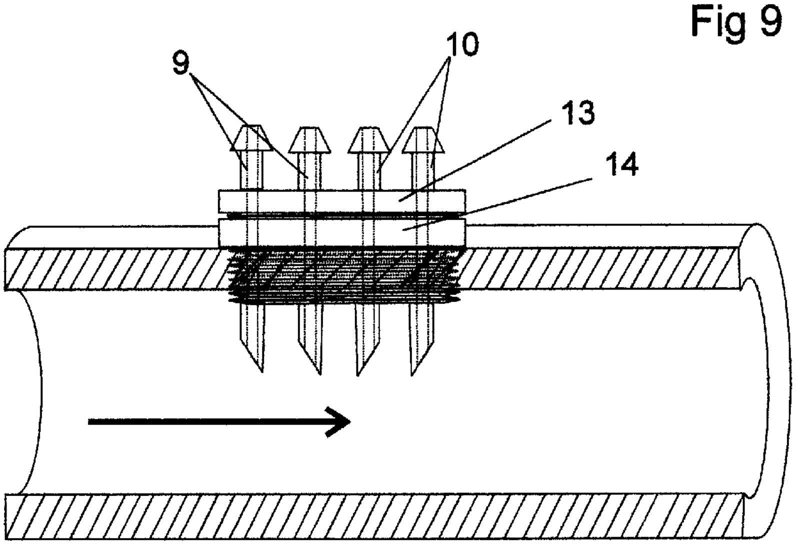
FIG. 9 shows multiple inlet and outlet fittings combined in one fitting with the adjustable depth feature, installed in a flow line.

As shown in FIGS. 6 and 7, flexible tubing is pressed over the barbed tubing connection of outlet fitting 9 and inlet fitting 10. The flexible tubing connected to outlet fitting 9 is then attached to the outlet tube connection to tank 22 and the inlet fitting 10 is then attached to the inlet tube connection to tank 23.

Conclusion, Ramifications, and Scope

Accordingly, the reader will see the differential pressure fitting of my invention makes it much easier to install an injection unit into a flow line since no pipe cutting and repair is required and one fitting can be installed in all sizes and types of pipe. Additionally, installations are made without rerouting pipe to accommodate the injector unit and can be done in very confined locations, saving time and money. It is more economical to manufacture because one fitting replaces many fittings of various sizes, manufactured from many different plastics and metals. It eliminates the need to manufacture a number of different injector units to fit various sizes and types of pipe. Also, it eliminates stress on the flow line and allows the injector to be placed away from the installation point in a secure or convenient area, which also allows larger injector units to be installed more easily. It provides a better flow range with higher injection accuracy without creating any flow volume or pressure loss. Furthermore, the differential pressure fitting has additional advantages in that it can be incorporated into any type of pipe fitting;

it can have multiple inlet and outlet connections combined in one fitting;

it can be installed in a flow line by tapping, gluing, threading, welding or any other means of connection;

it can be connected to a tank tapping, gluing, threading, welding or any other means of connection;

it can be manufactured in a fixed length or as an adjustable length;

it can be made of plastic, metal or any rigid material;

Although the description above contains many specificities, these should not be construed as limiting the scope of the invention but as merely providing illustrations of some of the presently preferred embodiments of this invention. For example, the fitting may be made in other shapes to accommodate other means of installation or connection such as threaded, glued, welded, soldered or any other means of connection to the flow line or to the tank. The fitting can be made larger or flow restriction could be added between the outlet and inlet fitting to accommodate a higher flow rate to and from the tank. The angle cut can be adjusted to increase or decrease flow. The size of the flow port can be increased, decreased or nozzles added to increase or decrease flow, etc. Extension member depth adjustment can be achieved by using an adjustment nut or spacers or other common means of length adjustment.

Thus the scope of the invention should be determined by the appended claims and their legal equivalents, rather than by the examples given.

I claim:

1. A system for use in use in connecting injection equipment to a flow line, comprising:

first and second, separate and identically constructed differential pressure fittings each having a tube connection portion leading to an extension portion; wherein the extension portion is positionable within the flow line and has a first opening in a side thereof that places a flow passage defined within the differential pressure fitting in fluid communication with the flow line;

wherein the tube connection portion is adapted to extend from the flow line and includes a barbed portion having a second opening that leads to the flow passage whereby flexible tubing is removeably matable over the barbed portion to connect the injection equipment between the first and second differential pressure fittings and, in turn, the flow line; and wherein the extension portion has a threaded portion adapted to mate with a corresponding tap hole formed in the flow line.

2. The system as recited in claim 1, wherein the tube connection portion comprises a tightening nut adjacent the extension portion for use in rotating the differential pressure fitting relative to the flow line.

3. The system as recited in claim 2, wherein a visible marking is formed on the tube connection portion and is aligned with the first opening.

4. The system as recited in claim 2, further comprising an adjusting nut matable with the treaded portion and moveable to vary the length of the extension portion that is positionable within the flow line.

5. The system as recited in claim 1, wherein each differential pressure fitting comprises molded nylon.

6. The system as recited in claim 1, wherein the extension portion has an angled cut that forms the first opening in the side.

7. A differential pressure fitting for use in connecting injection equipment to a flow line, comprising:

a cylindrical tube portion axially aligned with a cylindrical extension portion; wherein the extension portion is positionable within the flow line and has a first opening formed in the cylindrical side thereof that places a flow passage defined within the differential pressure fitting in fluid communication with the flow line; wherein the tube connection portion is adapted to extend from the flow line and includes a barbed portion having a second opening that leads to the flow passage whereby flexible tubing is removeably matable over the barbed portion to connect the injection equipment to the differential pressure fitting and, in turn, the flow line; and wherein the extension portion has a threaded portion adapted to mate with a corresponding tap hole formed in the flow line.

8. The differential pressure fitting as recited in claim 7, wherein the tube connection portion comprises a tightening nut adjacent the extension portion for use in rotating the differential pressure fitting relative to the flow line.

9. The differential pressure fitting as recited in claim 8, wherein a visible marking is formed on the tube connection portion and is aligned with the first opening.

10. The differential pressure fitting as recited in claim 7, wherein the tube connection portion and the extension portion comprise molded nylon.

11. The differential pressure fitting as recited in claim 7, wherein the extension portion has an angled cut at its end that forms the first opening in the side.

12. An injection system for use in connection with a flow line, comprising:

an injection tank;

first and second, separate and identically constructed differential pressure fittings defining a flow passage intermediate a first opening and a second opening wherein the first opening is positionable in fluid communication with the flow line; and first and second flexible tubes removeably matable with a respective one of the differential pressure fittings over the second opening to connect the injection tank between the first and second differential pressure fittings;

wherein the first and second differential pressure fittings each comprise a threaded portion for mating with the flow line.

13. The system as recited in claim 12, wherein the first and second differential pressure fittings are comprised of a nylon material.

14. The system as recited in claim 12, wherein the first and second differential pressure fittings are comprised of a plastic material.

15. The system as recited in claim 12, wherein the first and second differential pressure fittings are comprised of a metal material.

16. The system as recited in claim 12, wherein the first and second differential pressure fittings each comprise an extension portion in which the first opening is formed and wherein the first and second differential pressure fittings are adapted to allow the extension portion to extend into the flow line at varying, controlled depths.

17. The system as recited in claim 16, wherein the first opening is formed in the side of the extension portion of each of the first and second differential pressure fittings.

18. The system as recited in claim 17, wherein the end of the extension portion of each of the first and second differential pressure fittings is cut at an angle to create the first opening.

19. The system as recited in claim 17, wherein each of the first and second differential pressure fittings comprises a marked portion that is visible when the differential pressure fitting is attached to the flow line and which is aligned with the first opening.

20. The system as recited in claim 12, wherein each of the first and second differential pressure fittings includes a barbed portion in which the second opening is defined.

21. The system as recited in claim 12, wherein the first and second differential pressure fittings are incorporated into a hose connection connectable with the flow line.

22. The system as recited in claim 21, further comprising a flow restrictor formed within the hose connection intermediate the first opening of the first differential pressure fitting and the first opening of the second differential pressure fitting.

23. The system as recited in claim 22, wherein the first and second differential pressure fittings each include an extension portion, having the first opening, that extends into the hose connection and wherein the first opening of the extension portion of the first differential pressure fitting faces in a direction that is generally opposite from the direction in which the first opening of the extension portion of the second differential pressure faces.

24. The system as recited in claim 23, wherein an end of the extension portion of each of the first and second differential pressure fittings is provided with an angled cut to create the first opening.

25. The system as recited in claim 24, wherein each of the first and second differential pressure fittings comprises a barbed portion in which the second opening is formed.

26. The system as recited in claim 25, wherein the first and second differential pressure fittings are generally cylindrical in shape.

27. The system as recited in claim 21, wherein the first and second differential pressure fittings are in threaded engagement with the hose connection.

28. The system as recited in claim 21, wherein the hose connection is matable with a hose bib.

* * * * *

UNITED STATES PATENT AND TRADEMARK OFFICE

CERTIFICATE OF CORRECTION

PATENT NO. : 6,609,733 B2
DATED : August 26, 2003
INVENTOR(S) : Dan Gilmore

It is certified that error appears in the above-identified patent and that said Letters Patent is hereby corrected as shown below:

Column 6,
Line 30, after "portion;" insert -- wherein the extension portion is positionable within the flow line and has a first opening formed. a cylindrical tube portion axially aligned with a cylindrical extention portion; --

Signed and Sealed this

Sixth Day of January, 2004

JAMES E. ROGAN
*Director of the United States Patent and Trademark Office*